No. 819,349. PATENTED MAY 1, 1906.
P. HANSON.
MOWER.
APPLICATION FILED MAR. 4, 1902.
5 SHEETS—SHEET 1.
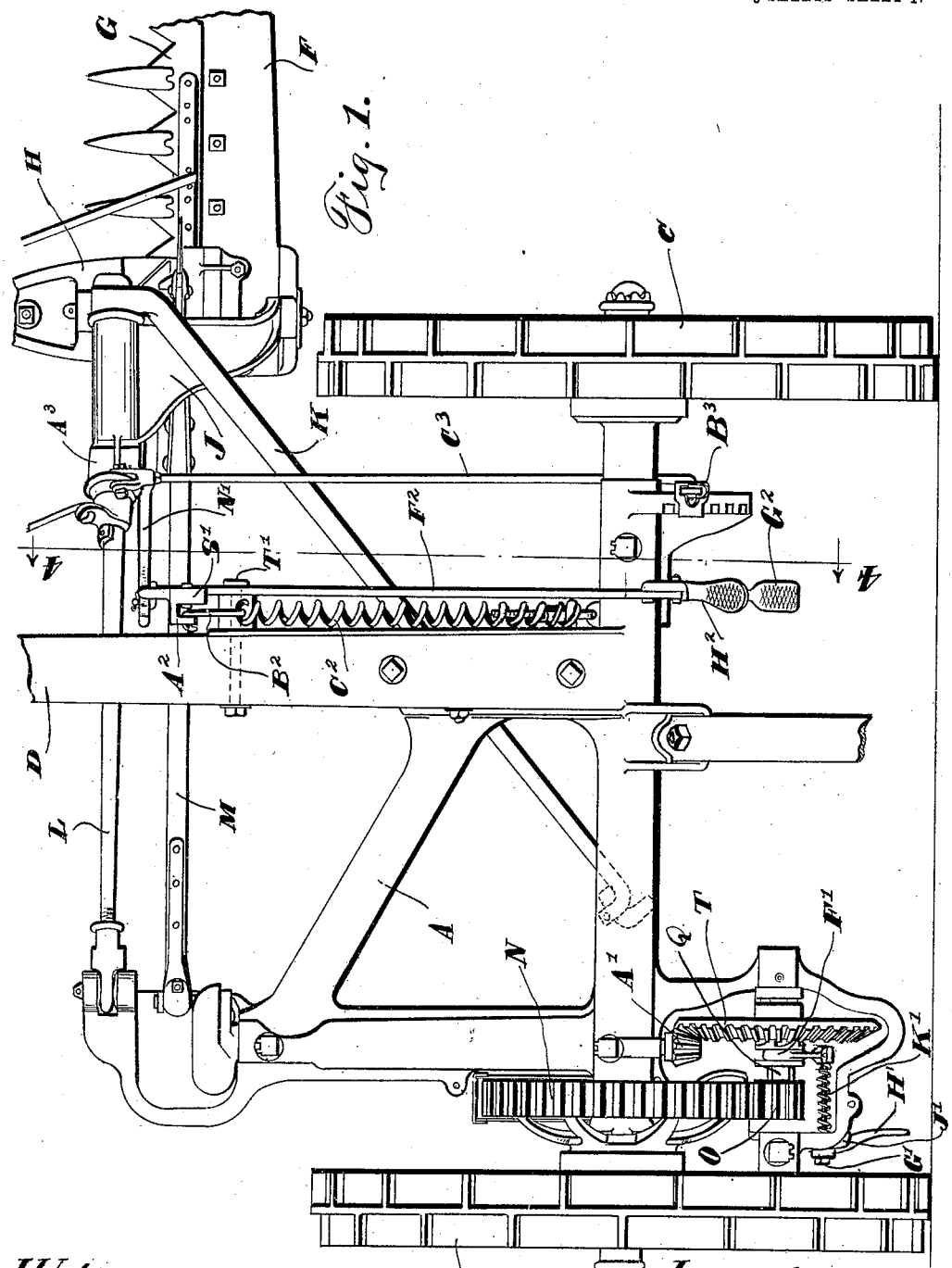

No. 819,349. PATENTED MAY 1, 1906.
P. HANSON.
MOWER.
APPLICATION FILED MAR. 4, 1902.
5 SHEETS—SHEET 2.
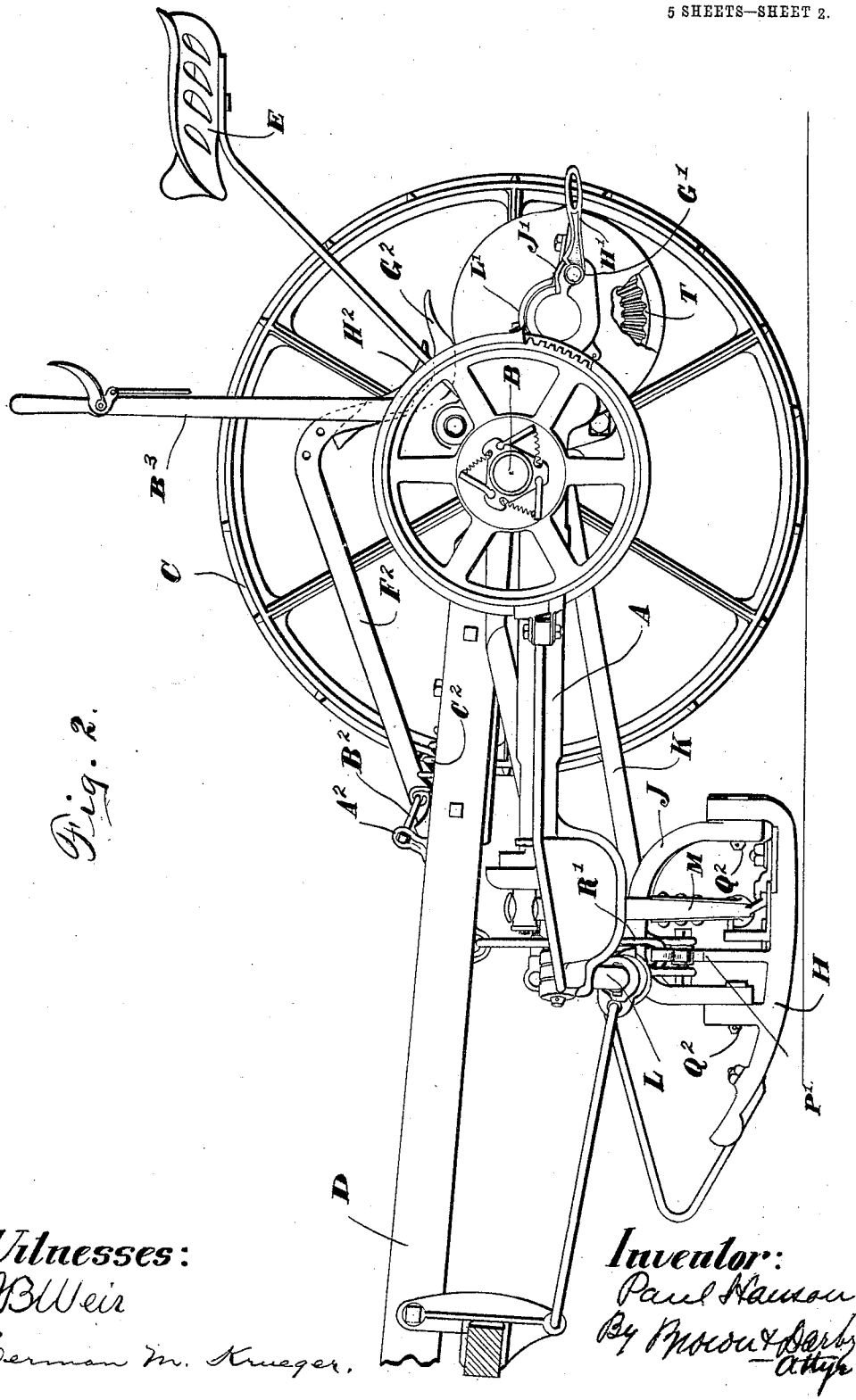

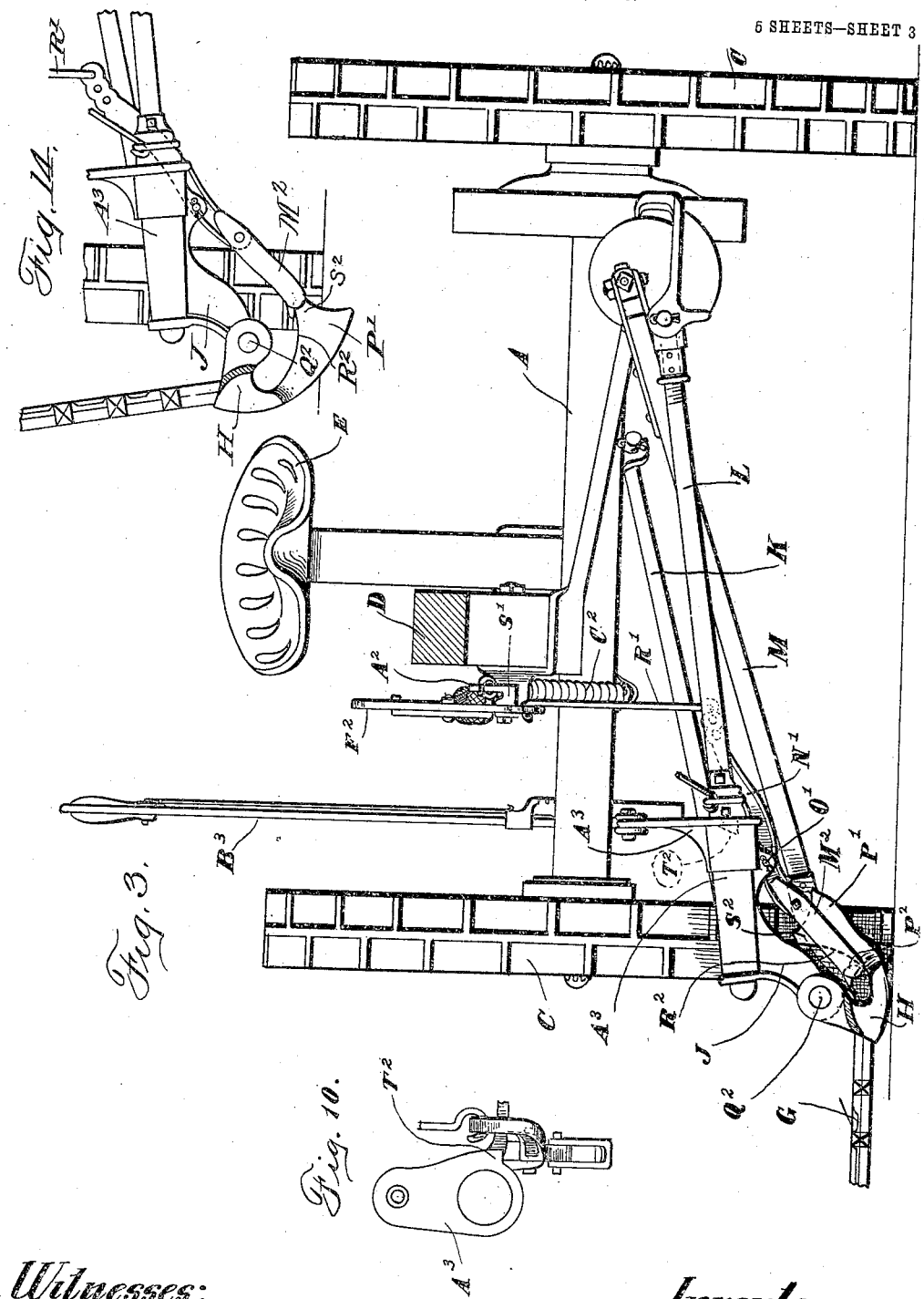

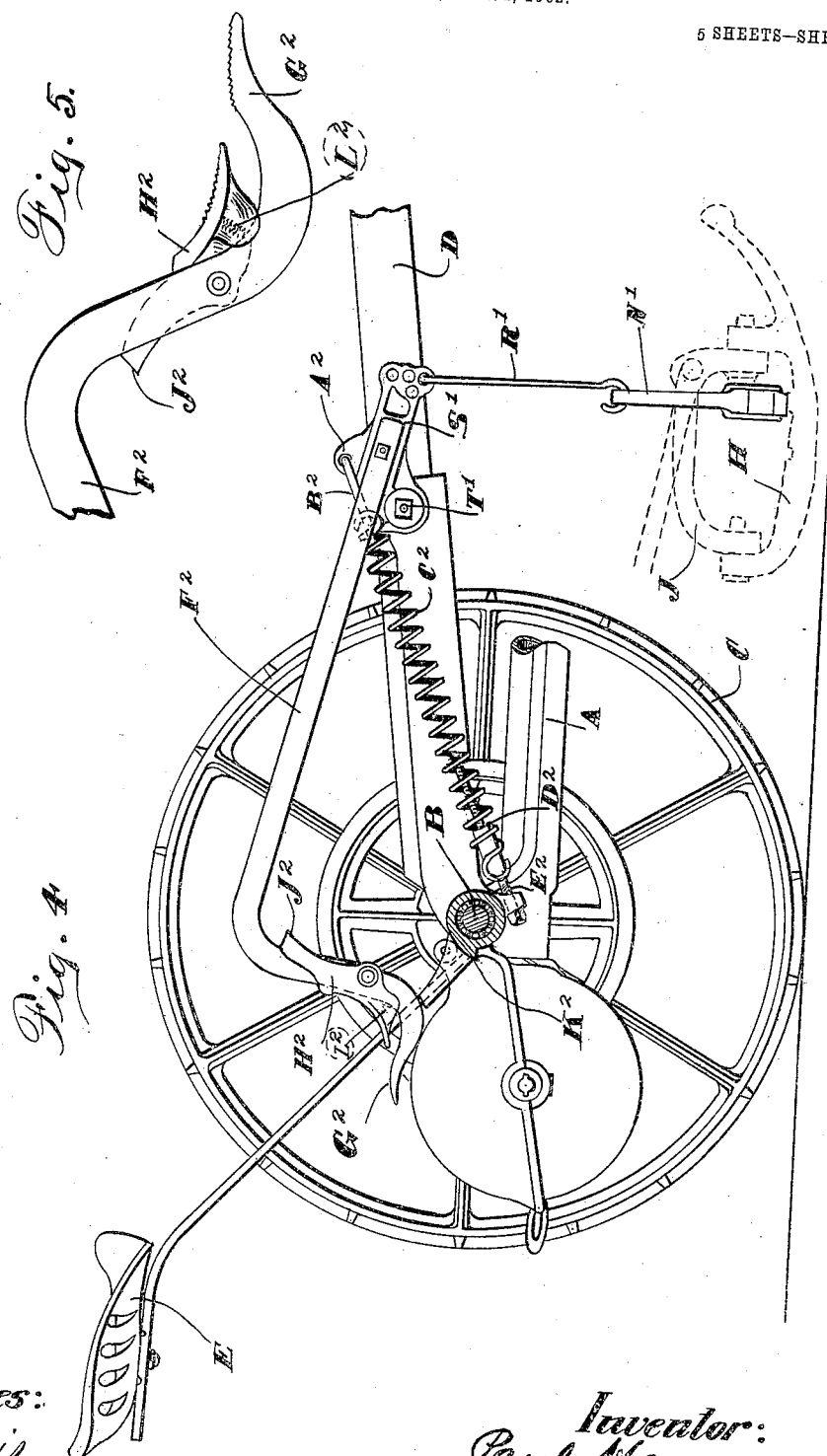

No. 819,349.　　　　　　　　　　　PATENTED MAY 1, 1906.
P. HANSON.
MOWER.
APPLICATION FILED MAR. 4, 1902.
5 SHEETS—SHEET 5.
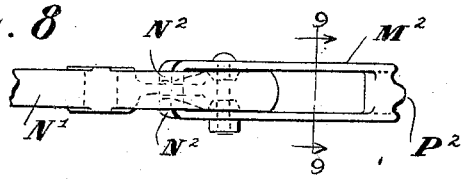
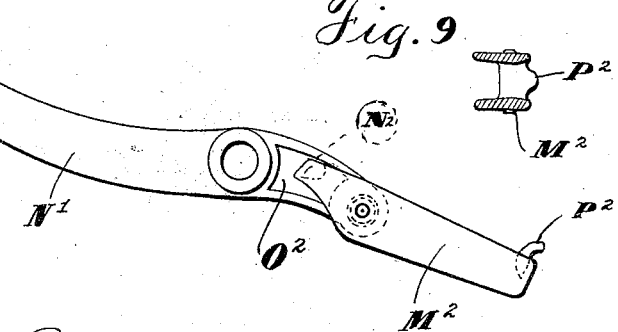
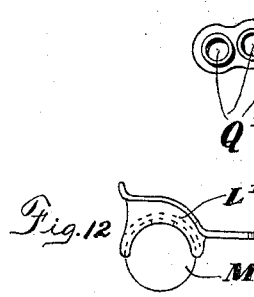
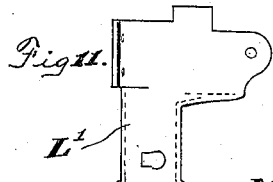
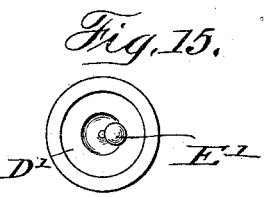
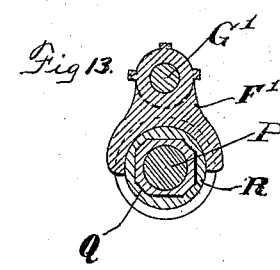
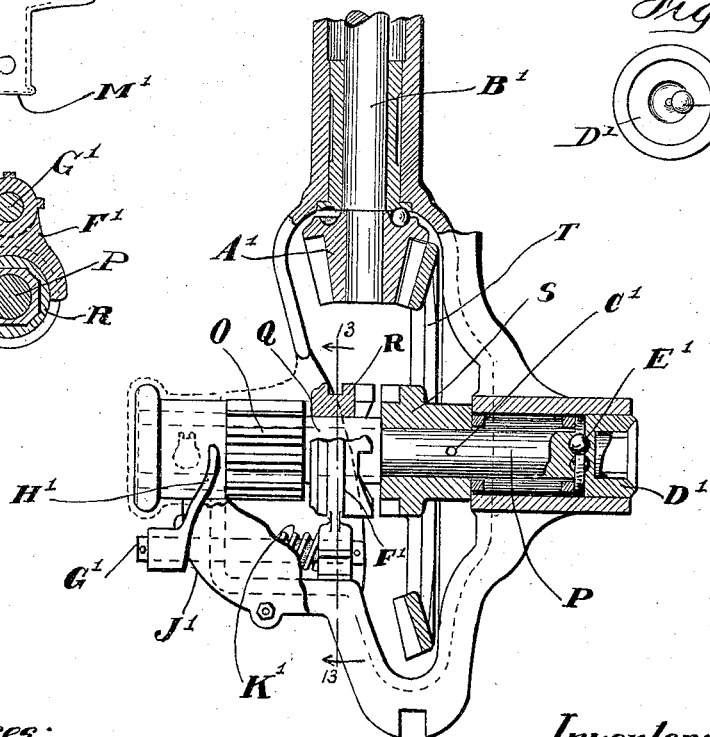
Witnesses:
J B Weir
Herman M. Krueger.
Inventor:
Paul Hanson
By Brown & Darby
Attys cles concentrically the axis of the shaft P,

UNITED STATES PATENT OFFICE.

PAUL HANSON, OF ST. PAUL, MINNESOTA.

MOWER.

No. 819,349.  Specification of Letters Patent.  Patented May 1, 1906.

Application filed March 4, 1902. Serial No. 96,644.

*To all whom it may concern:*

Be it known that I, PAUL HANSON, a citizen of the United States, residing at St. Paul, in the county of Ramsey and State of Minnesota, have invented a new and useful Mower, of which the following is a specification.

This invention relates to mowers.

The object of the invention is to simplify and improve the construction of machines of this class and to render the same more efficient in operation.

The invention consists substantially in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in plan, parts broken off, of a construction of mowing-machine embodying the principles of my invention. Fig. 2 is a side elevation of the same, parts broken off. Fig. 3 is a view in front elevation. Fig. 4 is a central longitudinal section on the line 4 4, Fig. 1, looking in the direction of the arrows. Fig. 5 is a broken detail view in side elevation of the foot-lever and its locking-latch. Fig. 6 is a broken detail view in horizontal section of the gear mechanism for driving the sickle-bars. Fig. 7 is a detached detail view in side elevation of the gag-lever, showing the application thereto of the locking extension thereof. Fig. 8 is a top plan view of the same, the gag-lever being broken off. Fig. 9 is a transverse section on the line 9 9, Fig. 8, looking in the direction of the arrows. Fig. 10 is a detached detail view showing the arrangement of gag-lever with reference to the stop or shoulder therefor on the yoke-sleeve. Fig. 11 is a detached detail view in plan of the casing inclosing the driving-pinion of the pitman-actuating gearing. Fig. 12 is an end elevation of the same. Fig. 13 is a section on the line 13 13, Fig. 6, looking in the direction of the arrows. Fig. 14 is a detail view in front elevation, similar to Fig. 3, showing the cutter-bar in raised position and the other parts in corresponding position. Fig. 15 is a detail view in section, the plane of section being transverse to the shaft P, shown in Fig. 6, and through the ball-bearing E'.

The same part is designated by the same reference-sign wherever it occurs throughout the several views.

In the drawings, reference-sign A designates the main frame, in which is journaled the main axle B, upon which are mounted the usual traction-wheels C.

D designates the tongue or pole of the machine; E, the driver's seat; F, the finger-bar; G, the cutter bar or sickle; H, the shoe; J, the yoke; K, a brace-bar; L, the drag-bar or coupling-arm upon which the yoke J is sleeved, and M the pitman for actuating the cutter-bar. These parts may be of the usual or any well-known or convenient construction and arrangement, and in the specific details of construction and arrangement thereof form no part of my present invention.

The first part of my invention relates particularly to the gearing by which the pitman M is actuated and which will now be described.

Mounted upon the main axle B is a drive-gear N, arranged to mesh with and drive a pinion O, loosely sleeved upon a short counter-shaft P, journaled, preferably, in roller-bearings in the usual and ordinary manner, supported upon a suitable extension of the main frame. The pinion O is provided with an exteriorly-squared or polygonal-shaped hub extension Q, upon which is mounted to slide a sleeve R, whereby said sleeve is rotated when pinion O is rotated, but can be slid longitudinally with respect to the pinion-hub. This sleeve carries or is formed with a clutch-face, as clearly shown in Fig. 6, arranged to coöperate with a similar clutch-face formed upon a sleeve S, also mounted on stub-shaft P and connected to or forming part of a bevel-gear T, arranged to mesh with and drive a bevel-pinion A', mounted upon the shaft B', through which the pitman M is actuated. If desired, and in order to prevent endwise motion of the shaft P, the sleeve S may be pinned to said shaft. This pin is shown at C', Fig. 6. The end thrust upon shaft P is taken upon a plug D', inserted in the bearing-block in which said shaft is journaled, and a ball E' is interposed between the end of shaft P and said plug. Preferably, and as clearly shown in Fig. 6, this ball is arranged to operate or travel in a grooved track or raceway formed partially in the end of shaft P and partially in the opposed end of plug D', and which track or raceway encircles concentrically the axis of the shaft P, whereby said ball operates somewhat out of center with reference to the axis of rotation of shaft P. Only one ball E' is employed in this end-thrust bearing, because only one is sufficient, by reason of the fact that it is arranged to operate in close proximity to the axis of the shaft. The clutch member or sleeve R may be operated in any suitable or convenient manner to effect the engagement or disengagement of the clutch members. I have shown a simple arrangement wherein a forked yoke F' is arranged to straddle and engage in a groove formed in the periphery of the sliding sleeve R, said fork or yoke being carried upon a rod G', upon which is mounted an operating-handle H', operating over a cam-surface J', whereby said rod G' is shifted longitudinally to shift the clutch-sleeve upon its bearing on the polygonal-shaped hub of pinion O. If desired, a spring K' may be arranged to exert its tension upon said rod in a direction to hold the clutch-sleeves in clutching relation. The cam-surface over which the operating-handle H' works serves to overcome the tension of the spring to effect a disengagement or uncoupling of the clutch-sleeves and to hold the clutch-sleeve R in disengaged relation.

The pinion O and the adjacent roller-bearing of shaft P are inclosed in a shield or casing L'. (Most clearly indicated in Figs. 2, 11, and 12.) This casing or shield forms an inclosing cover for these parts to prevent the ingress of dust or dirt to the bearing, and in order to provide an efficient arrangement for this purpose this shield or cover is provided with an end extension M', which fits down over the end of the shaft to entirely inclose the same. This shield or inclosing casing may be conveniently bolted or otherwise attached to the extension of the main frame in which said shaft is journaled.

The next feature of my invention relates to the mechanism for operating the gag-lever. This gag-lever is indicated by reference-sign N' and is pivotally mounted, as at O', upon a lug or extension formed on the yoke J in the usual manner, and at one end thereof is arranged to bear upon an extension or lug P', formed on the shoe H. At its other end said gag-lever is provided with a series of holes or openings Q', into any one of which may be secured a lifting-link R'. The other end of said lifting-link is connected pivotally to a casting S', pivotally mounted, as at T', upon the main frame of the machine. This casting is provided with a lug or extension A$^2$, to which is connected, through a link B$_2$ or otherwise, one end of a spring C$^2$, the other end of said spring being adjustably connected to a fixed part of the main frame—as, for instance, by means of a nut D$^2$, engaged by a threaded bolt or rod E$^2$, mounted in a lug or extension of the main frame, as clearly indicated in Fig. 4. Rigidly secured to casting S' is a long lever F$^2$, provided with a foot-treadle G$^2$, arranged in convenient relation to the driver's seat to be engaged and operated by the foot of the driver. By this construction it will be readily seen that the lever F$^2$ and casting S', to which said lever is secured, in effect, constitute a bell-crank lever, the lever F$^2$ forming one arm of said lever, the other arm of said lever affording means of connection for the spring C$^2$. It will be seen from this construction that an exceedingly long leverage is secured in a most simple and efficient manner when it is desired to rock lever F$^2$, the spring C$^2$ serving as a counterbalance for the weight of the shoe and its associated parts. Pivotally mounted upon the treadle G$^2$ is a foot-pawl H$^2$, having an engaging end J$^2$, adapted to coöperate with a shoulder or lug K$^2$, (see Fig. 4,) formed in convenient position upon the framework of the machine. If desired, a spring (indicated in dotted lines at L$^2$, see Fig. 5) may be interposed between the treadle G$^2$ and the pawl-treadle H$^2$, the tension of said spring being normally exerted to hold the locking-pawl of treadle H$^2$ in position for the nose or engaging end J$^2$ thereof to ride over and snap against or under or in engaging relation with respect to the lug or projection K$^2$ when said lever F$^2$ has been sufficiently depressed in the operation of raising the coupling-arm shoe and associated parts. In this manner a lock is provided for holding the lever F$^2$ in its extreme depressed position. When it is desired to release this lock, the driver engages the pawl-treadle H$^2$ with his foot to effect a disengagement of the toe or engaging end J$^2$ of the locking-pawl from the lug or projection K$^2$, thereby permitting lever F$^2$ to be returned to its elevated position.

In machines of this class it is desirable to provide means for locking the cutter-bar in vertical or upright position when said bar is folded or swung to such position. My present invention contemplates the provision of means which are simple and efficient for accomplishing this purpose and wherein I provide the gag-lever N' with a pivoted auxiliary piece M$^2$. This auxiliary piece is bifurcated or forked to receive the end of the gag-lever between the arms thereof, said arms being provided with studs or projections N$^2$, arranged to project inwardly or toward each other and into an opening O$^2$, formed in the gag-lever, as clearly shown in Figs. 7, 8, and 9. At its end the auxiliary piece M$^2$ is provided with an engaging lug or projection P$^2$. The lug or projection P', formed on or connected to shoe H and through which said shoe is rocked about the axis of its pivots Q$^2$, (see Fig. 3,) is provided with a curved or cam surface, (indicated at R$^2$,) which curved surface is somewhat eccentric with respect to the axis of pivots Q$^2$ of the shoe, and when the finger-bar occupies the horizontal position, as indicated in Fig. 3, the shoe extension P' rides up into the space between the arms of auxiliary locking latch or part M². When, however, the shoe is rocked about its pivots Q², so that the finger-bar is carried to its vertical or upright position, this shoe extension or lug P' is withdrawn from between the arms of the auxiliary piece M² and the lug or projection P² of said auxiliary piece rides along the curved or cam surface R² of said extension until the finger-bar reaches its vertical or upright position, when said lug P² will ride or snap over the portion or shoulder S² of lug or extension P', thereby forming a lock to hold the finger-bar in its vertical or upright position. A lug T² is formed on the sleeve A³ of the yoke and constitutes a limit-stop to limit the rocking movement of the gag-lever N' when the latter is rocked about its pivot O' by the operation of lifting-link R' when the foot-lever F² is sufficiently depressed. This lug T² projects outwardly from the sleeve A³, as clearly shown in Fig. 10. If the auxiliary piece M² of the gag-lever were rigid with said lever, then when said lug or extension P² rides upon the inclined surface R² to snap over the shoulder S² into locking relation the danger is incurred of forcing the gag-lever off or away from engagement with shoulder or lug T², formed on the sleeve A³ of the yoke, so that when the lug P² finally snaps over the shoulder S² the parts will suddenly drop by reason of the return of the gag-lever to engagement with the shoulder T² and hence imposing an undue strain upon the parts supported thereby. To overcome this objection, I provide the auxiliary piece M², which is, as above explained, pivotally connected to the gag-lever, so as to provide a desirable relative movement between these parts, thereby enabling the projection P² to snap over the shoulder S² when the parts are brought into proper relation therefor without danger of the gag-lever being forced away from its locking or holding lug T², and hence I avoid the objection of the parts dropping at the moment the locking-lug P² snaps over the shoulder S². When the finger-bar is held or locked in its vertical or upright position by the locking mechanism, as above described, it may be released by first releasing the foot-treadle lever F², so as to permit the shoe to fall to the ground. Thereafter by the driver or operator engaging the foot-treadle G² from underneath and raising the same to greater extent than is required to permit the shoe to rest upon the ground the gag-lever is sufficiently rocked to permit the auxiliary pivoted extension M² thereof to become loose upon its pivot and to be disengaged from engaging relation with respect to shoulder S², and thereafter the finger-bar may be permitted to be turned or swung down into horizontal position.

The usual tilting lever B³ may be provided for adjusting the tilt of the points of the cutters, said tilting lever being connected by a link C³ with an extension of the sleeve A³, by which the yoke is sleeved upon the coupling-arm L.

It is believed that the operation will be readily understood from the foregoing description, taken in connection with the accompanying drawings; but the operation of the gag-lever will now be more fully set forth.

When the driver places his foot upon the foot-treadle G² and exerts pressure thereon, lever F² is rocked, thereby rocking casting S' and drawing vertically upon link R' and hence rocking gag-lever N' in a direction for the free end thereof to engage shoe projection or extension P', thereby rocking said shoe, so as to vertically raise the outer end of the finger-bar. This movement and operation continues until the gag-lever N' abuts against the shoulder or stop T², whereupon the parts become locked, and continued downward swing of arm F² rocks the brace-bar K and drag-bar L by swinging the same about their points of pivotal connection to the main frame, thereby raising vertically the coupling-arm, yoke, shoe, and inner end, as well as outer end, of the finger-bar in the usual manner. When it is desired to lock the finger-bar in its vertical or upright position, said bar being raised to such position by hand or otherwise in the ordinary manner, the lug or projection P² on the auxiliary part M² of the gag-lever rides over the cam-surface R² on the shoe extension P', finally snapping over the shoulder S² and locking the finger-bar in its vertical or upright position, the pivotal connection between the auxiliary piece M² and gag-lever preventing the gag-lever from being forced away from its locking or engaging lug T².

Many variations and changes in the details of construction and arrangement of parts would readily occur to persons skilled in the art and still fall within the spirit and scope of my invention. I do not desire, therefore, to be limited or restricted to the exact or specific details shown and described; but, Having now set forth the object and nature of my invention and a construction embodying the principles thereof, and having described its purpose, function, and mode of operation in the various features thereof, what I claim as new and useful and of my own invention, and desire to secure by Letters Patent, is—

1. In a mowing-machine, a main frame provided with an extension, bearings supported in said extension, a counter-shaft journaled in said bearings, a plug to receive the end thrust of said shaft, a ball-bearing interposed between the end of said shaft and said plug, said ball-bearing including a circular ball-race formed in the end of said shaft and encircling concentrically the axis of rotation of the shaft, whereby said ball operates off the center of rotation of said shaft, a pitman, a main axle, a drive-gear thereon and gearing carried by said counter-shaft and actuated by the drive-gear on said main axle for operating said pitman, as and for the purpose set forth.

2. In a mowing-machine, a yoke, a shoe pivotally mounted thereon and provided with a lug or extension, said lug or extension having a shoulder at the end thereof, a gag-lever pivotally mounted upon said yoke, an auxiliary part pivotally connected to said lever and forming an extension thereof, said auxiliary part having at its extremity an engaging lug arranged to snap over the shoulder on said shoe extension to form a lock to hold said shoe in tilted position, and means for releasing said lock, as and for the purpose set forth.

3. In a mowing-machine, a shoe, a support therefor upon which said shoe is pivotally mounted, a finger-bar carried by said shoe, said shoe provided with an extension, said extension having a shoulder at the end thereof, a gag-lever arranged to engage said extension to tilt the shoe, an auxiliary piece pivotally connected to said gag-lever and forming a continuation thereof, said auxiliary piece provided with an engaging lug at the end thereof said lug arranged, when said finger-bar is raised to vertical or upright position, to snap over said shoulder to form a lock therefor and connections for releasing said lug, as and for the purpose set forth.

4. In a mowing-machine, a shoe, a support upon which said shoe is pivotally mounted, a finger-bar carried by said shoe, said shoe provided with an extension having a shoulder at the end thereof, a gag-lever arranged to coöperate with said extension to tilt said shoe when said lever is rocked, a forked or bifurcated extension pivotally connected to said lever for rocking movement relatively thereto, said extension forming a continuation of said lever, and provided at its extremity with an engaging lug adapted, when the finger-bar is raised to vertical or upright position, to snap over and engage the shoulder on the shoe extension to form a lock therefor, and means for releasing the engagement of said extension and shoulder, as and for the purpose set forth.

5. In a mowing-machine, a shoe, means for pivotally supporting said shoe, said shoe provided with an extension having a shoulder, a finger-bar carried by said shoe, a gag-lever having an opening therethrough, a forked extension pivotally connected to said lever and having lugs projecting into said opening whereby said extension is permitted rocking movement relative to said lever, an engaging lug formed on said extension and operating to snap over and lock said shoulder when said finger-bar is raised into vertical or upright position, as and for the purpose set forth.

6. In a mowing-machine, a main frame, a casting pivotally mounted thereon, a gag-lever, a lifting-link respectively connected to the casting and gag-lever, a counterbalancing-spring connected at one end to the main frame and at the other end to said casting, a foot-bar rigidly connected at one end to said casting and carrying at its opposite end a treadle arranged in convenient position to be engaged by the foot of the driver, and a latch carried by said foot-treadle, and a shoulder formed on the main frame, with which said latch coöperates, as and for the purpose set forth.

In witness whereof I have hereunto set my hand this 1st day of March, 1902, in the presence of the subscribing witnesses.

PAUL HANSON.

Witnesses:
E. C. SEMPLE,
S. E. DARBY.